(12) United States Patent
Snyder et al.

(10) Patent No.: US 12,172,501 B2
(45) Date of Patent: Dec. 24, 2024

(54) VEHICLE DOOR ASSEMBLY

(71) Applicant: NISSAN NORTH AMERICA, INC., Franklin, TN (US)

(72) Inventors: David Snyder, Southfield, MI (US); Jacob Overla, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 301 days.

(21) Appl. No.: 17/727,416

(22) Filed: Apr. 22, 2022

(65) Prior Publication Data

US 2023/0339298 A1    Oct. 26, 2023

(51) Int. Cl.
*B60J 5/04*   (2006.01)
*E05B 77/04*  (2014.01)
*E05B 79/20*  (2014.01)

(52) U.S. Cl.
CPC ............ *B60J 5/0433* (2013.01); *E05B 77/04* (2013.01); *E05B 79/20* (2013.01)

(58) Field of Classification Search
None
See application file for complete search history.

(56) References Cited

U.S. PATENT DOCUMENTS

| 7,568,744 | B2 | 8/2009 | Tenorio et al. |
| 7,648,192 | B2 | 1/2010 | Herline et al. |
| 8,414,038 | B2 | 4/2013 | Bedekar et al. |
| 8,955,257 | B2 | 2/2015 | Moriya et al. |
| 11,466,481 | B2 * | 10/2022 | Muta ....................... B60J 5/0413 |
| 11,660,939 | B2 * | 5/2023 | Kovie .................... B60J 5/0443 |
| | | | 296/146.6 |
| 2004/0080179 | A1 | 4/2004 | Okazaki et al. |
| 2011/0095546 | A1* | 4/2011 | Russell ................. B60J 5/0434 |
| | | | 292/216 |
| 2019/0136583 | A1 | 5/2019 | Gray et al. |
| 2019/0284845 | A1 | 9/2019 | Fraley |
| 2020/0408004 | A1 | 12/2020 | Contreras et al. |

FOREIGN PATENT DOCUMENTS

| EP | 2581246 A1 | 4/2013 |
| EP | 2174812 B1 | 5/2014 |
| JP | 2017193911 A | 10/2017 |

* cited by examiner

*Primary Examiner* — Joseph D. Pape
(74) *Attorney, Agent, or Firm* — Global IP Counselors, LLP (57) ABSTRACT

A vehicle door assembly includes an inner door panel that defines a door cavity, a latch mechanism and a reinforcing bracket. The latch mechanism has a latch lever that moves when the latch mechanism is operated to release the vehicle door from a closed orientation. The reinforcing bracket has a first end and a second end. The first end is attached to a forward area of the inner door panel. The second end has an attachment portion, a lever capture portion and a tab portion. The attachment portion is attached to a rearward area of the inner door panel. The lever capture portion is outboard from the latch lever. The tab portion is adjacent to the lever capture portion. The reinforcing bracket is shaped and configured to deform in response to an impact event moving the lever capture portion inboard toward the latch lever interfering with movement thereof.

19 Claims, 6 Drawing Sheets

VEHICLE DOOR ASSEMBLY

BACKGROUND

Technical Field

The present disclosure generally relates to vehicle door assembly. More specifically, the present disclosure relates to a vehicle door assembly that includes a reinforcing member that is shaped a dimensioned to direct deformation of the reinforcing member during an impact event to move a lever capture portion of the reinforcing member toward a lever of a door latch mechanism preventing movement of the lever and preventing the door latch mechanism from operating thereby retaining the door assembly in a closed orientation during the impact event.

Background Information

Experimentation has shown that during an impact event where impacting force acts on a door assembly of a vehicle, impact energy is distributed to the adjacent pillar structures when the door assembly remains in a closed orientation. Specifically, hinges of the door assembly attached to a first pillar structure of the vehicle transmits a portion of the impact energy to the first pillar structure. Similarly, a latch mechanism of the door assembly latched to a striker of a second pillar structure transmits a portion of the impact energy to the second pillar structure with the latch mechanism maintaining the door assembly in the closed orientation.

SUMMARY

One object of the present disclosure is to provide a vehicle door assembly with a reinforcing member that is shaped a dimensioned to direct deformation of the reinforcing member during an impact event to move a lever capture portion of the reinforcing member toward a lever of a door latch mechanism preventing movement of the lever and preventing the door latch mechanism from operating thereby retaining the door assembly in a closed orientation during the impact event.

In view of the state of the known technology, one aspect of the present disclosure is to provide a vehicle door assembly with an inner door panel, a latch mechanism and a reinforcing bracket. The inner door panel at least partially defines a door cavity. The latch mechanism has a latch lever. The latch mechanism is configured to retain the vehicle door assembly in a closed orientation and is operable to release the vehicle door from the closed orientation. The reinforcing bracket has a first end, a main body and a second end. The first end is attached to a forward area of the inner door panel. The main body extends from the first end to the second end. The second end has an attachment portion, a lever capture portion and a tab portion. The attachment portion is attached to a rearward area of the inner door panel adjacent to the latch lever of the latch mechanism. The lever capture portion is directly outboard from the latch lever. The tab portion is adjacent to the lever capture portion extending in an inboard direction. In response to an impact event having a first level of impact force on the vehicle door assembly, the reinforcing bracket is shaped and dimensioned to deform moving the lever capture portion inboard toward the latch lever thereby interfering with movement of the latch lever.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
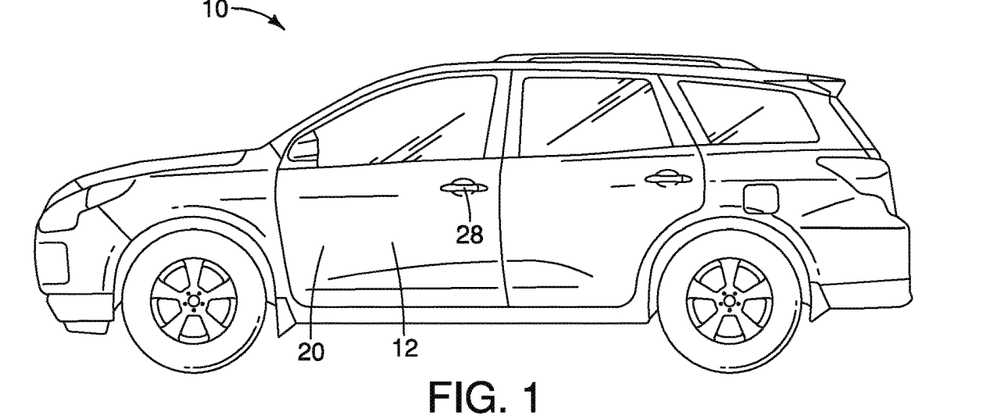
FIG. 1 is a side view of a vehicle having a door assembly in accordance with an exemplary embodiment.

Referring initially to FIG. 1, a vehicle 10 having a vehicle door assembly 12 with a reinforcing bracket 14 configured to interfere with operation of a door latch mechanism 16 during an impact event is illustrated in accordance with a first embodiment.

The vehicle 10 can be any vehicle design, such as, for example, a coupe, a sedan, a pickup truck or a sports utility vehicle (SUV). In the depicted embodiment, the vehicle 10 is an SUV. Further, the vehicle door assembly 12 (hereinafter the door assembly 12) is a front door but can alternatively be a rear door.

As shown in FIGS. 1-4, the door assembly 12 includes an outer door panel 20 (FIG. 1 only), an inner door panel 22, the reinforcing bracket 14 and the door latch mechanism 16. The inner door panel 22 includes a concaved area that at least partially defines a door cavity 26. The outer door panel 20 includes an outer periphery that is fixedly attached to a corresponding outer periphery of the inner door panel 22. The door cavity 26 is at least partially enclosed between the inner door panel 22 and the outer door panel 20.

Figure 3:
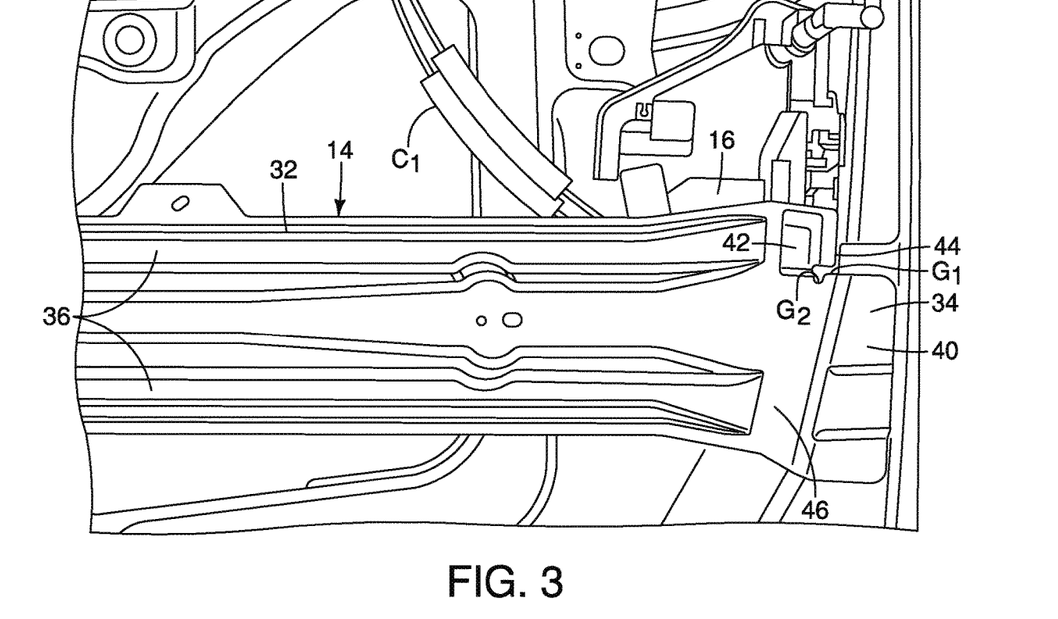
FIG. 3 is another side view of the door assembly showing a rearward portion of the door cavity of the inner door panel and further showing a second end (a rearward end) of the reinforcing bracket located adjacent to the door latch mechanism in accordance with the exemplary embodiment.
Figure 4:
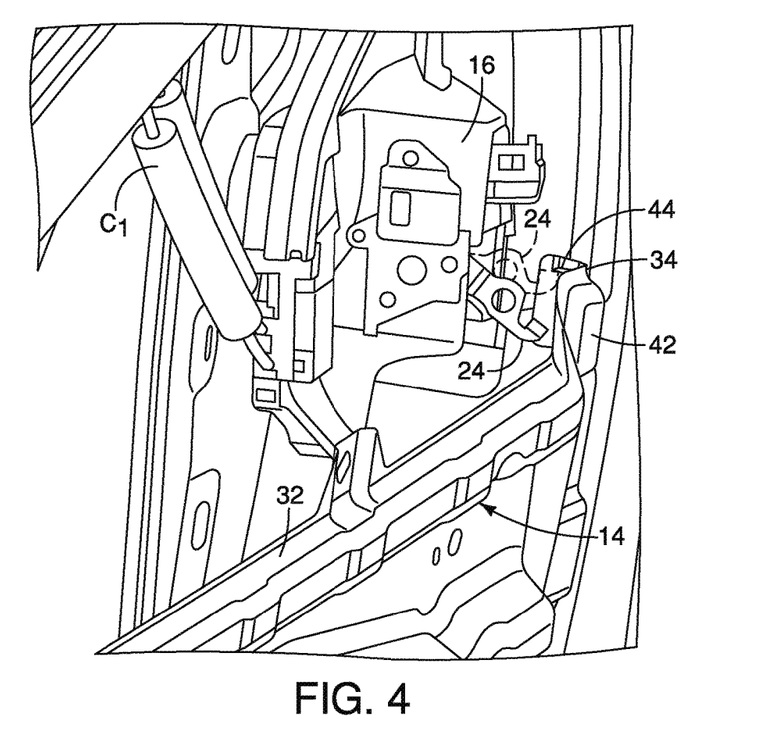
FIG. 4 is a perspective view of the rearward portion of the door cavity of the inner door panel depicted in FIG. 3 and further showing the second end (a rearward end) of the reinforcing bracket and a lever of the door latch mechanism with the lever in a door closed orientation in solid lines and the lever in a door open orientation in phantom lines in accordance with the exemplary embodiment.
Figure 5:
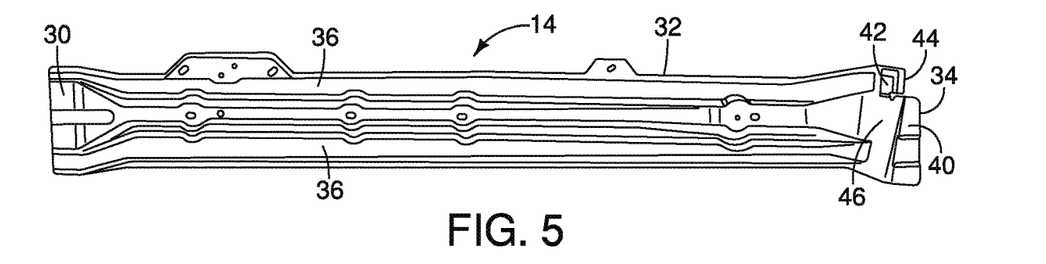
FIG. 5 is an outboard side view of the reinforcing bracket shown removed from the door assembly in accordance with the exemplary embodiment.

The door latch mechanism 16 (hereinafter the latch mechanism 16) is a conventional mechanism that is installed within the door cavity 26 to a rearward area 22a of the inner door panel 22, as shown in FIGS. 3 and 4. As shown in FIG. 4, the latch mechanism 16 includes a lever 24 (also referred to as the latch lever 24) that is moved between a first position (solid lines in FIG. 4) and a second position (phantom lines in FIG. 4). The latch mechanism 16 (and the lever 24) are operated in response to movement of a door handle 28. The door handle 28 is operably connected to the latch mechanism 16 via at least one cable $C_1$ in a conventional manner. When the latch mechanism 16 is operated by the door handle 28, the lever 24 moves from the first position (solid lines in FIG. 4) to the second position (phantom lines in FIG. 4). More specifically, when the latch mechanism 16 is in a convention door closed orientation (the door assembly 12 is depicted in the closed orientation in FIG. 1), the lever 24 is in the first position. When the latch mechanism 16 is operated to release the door assembly 12 such that the door assembly 12 can move to an open orientation (not shown), the lever 24 moves to the second position (phantom lines in FIG. 4). If the lever 24 is prevented from moving from the first position to the second position, then the latch mechanism 16 cannot operate properly and cannot release the door assembly 16. Consequently, with the lever 24 prevented from moving upward to the second position, the door assembly 16 cannot be opened. The movement of the latch lever 24 between the first position (solid lines in FIG. 4) to the second position (phantom lines in FIG. 4) is hereinafter referred to as the movement path of the latch lever 24.

Since latch mechanisms such as the latch mechanism 16 are conventional devices, further description of operation and function of the latch mechanism 16 is omitted for the sake of brevity.

As shown in FIGS. 2-8, the reinforcing bracket 14 has a first end 30, a main body 32 and a second end 34. The first end 30 is attached to a forward area 22b of the inner door panel 22. The second end 34 is attached to the rearward area 22a of the inner door panel 22 adjacent to the latch mechanism 16, as is described further below. The main body 32 extends from the first end 30 to the second end 34. The main body 32 includes a plurality of longitudinally extending strengthening or stiffening ribs 36 that extend substantially the entire length of the main body 32, but do not extend along the second end 34.

Figure 2:
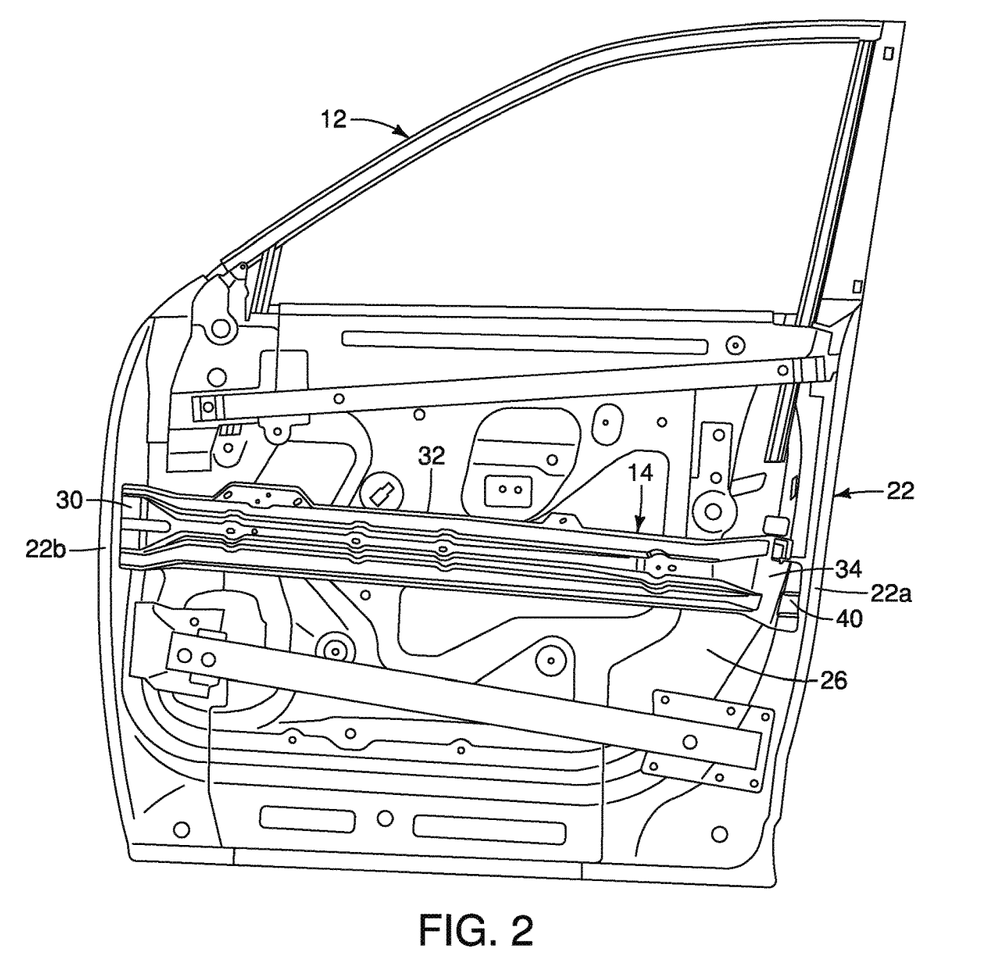
FIG. 2 is a side view of the door assembly with an outer door panel removed showing an inner door panel defining a door cavity that includes a reinforcing bracket and a door latch mechanism in accordance with the exemplary embodiment.
Figure 6:
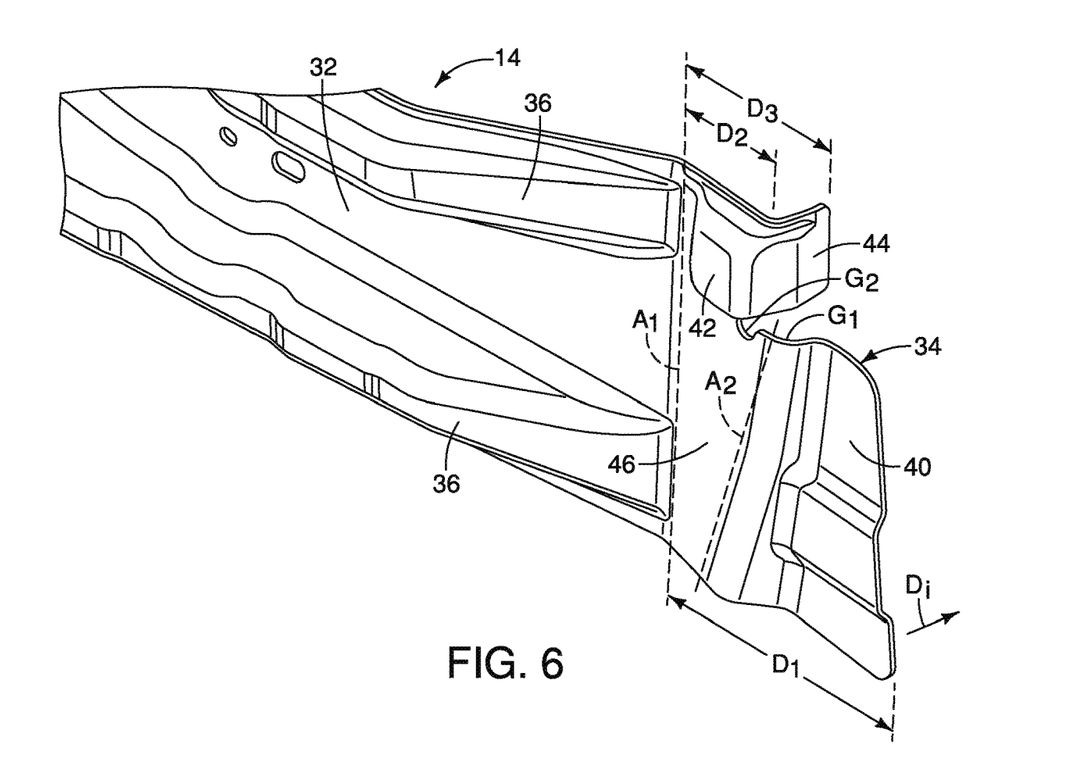
FIG. 6 is a perspective view of the second end (the rearward end) of the reinforcing bracket removed from the door assembly showing an attachment portion, a lever capture portion, a tab portion and a flat portion in accordance with the exemplary embodiment.
Figure 7:
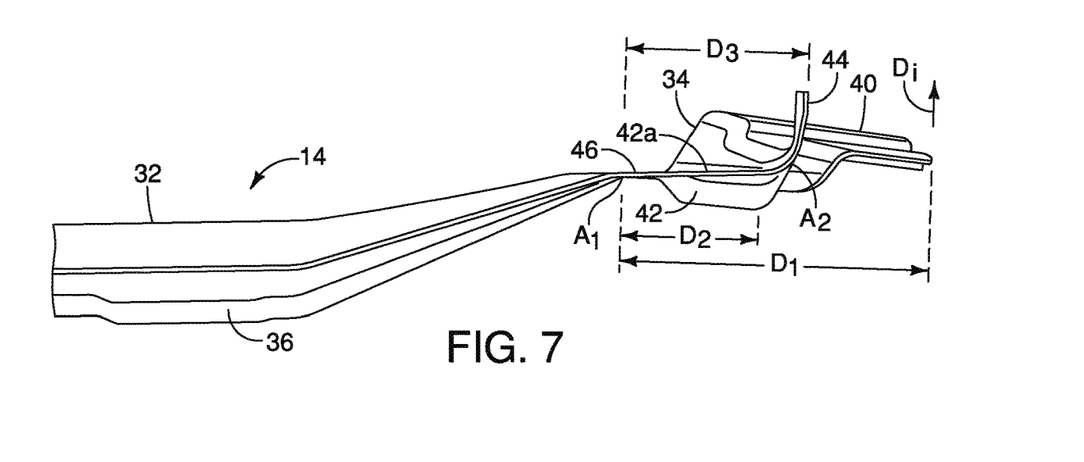
FIG. 7 is a top view of the reinforcing bracket showing further details of the attachment portion, the lever capture portion, the tab portion and the flat portion in accordance with the exemplary embodiment.
Figure 8:
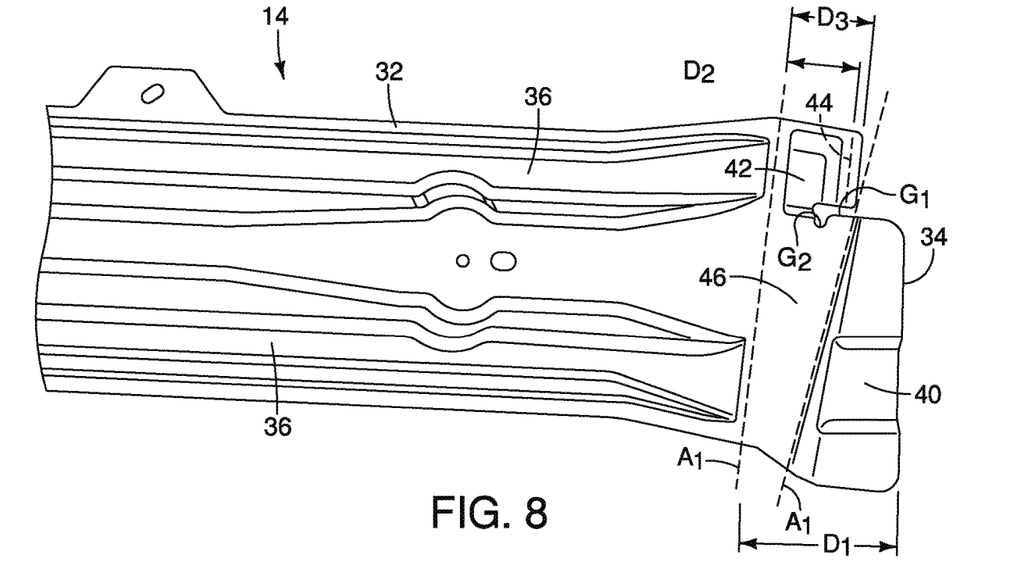
FIG. 8 is an outboard side view of the second end (the rearward end) of the reinforcing bracket removed from the door assembly showing further details of the attachment portion, the lever capture portion, the tab portion and the flat portion in accordance with the exemplary embodiment.

As shown in FIGS. 3-8, the second end 34 includes an attachment portion 40, a lever capture portion 42, a tab portion 44 and a flat portion 46. As shown in FIGS. 2-4, the attachment portion 40 is includes several flat or planar areas that directly attached to the rearward area 22a of the inner door panel 22 adjacent to the latch lever 24 of the latch mechanism 16 via, for example any of a variety of welding techniques. As shown in FIGS. 6, 7 and 8, the attachment portion 40 extends a first distance $D_1$ rearward from the main body 32 of the reinforcing bracket 14 where the rearward end of the main body 32 corresponds to rearward ends of the stiffening ribs 36.

Figure 9:
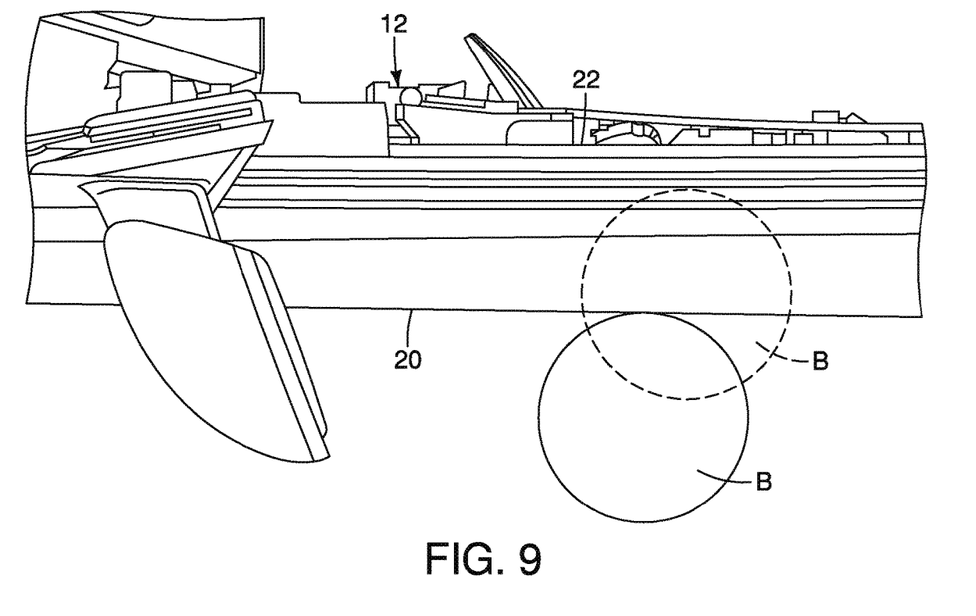
FIG. 9 is a top view of the vehicle showing the door assembly contacting a fixed barrier during an impact event in accordance with the exemplary embodiment.
Figure 10:
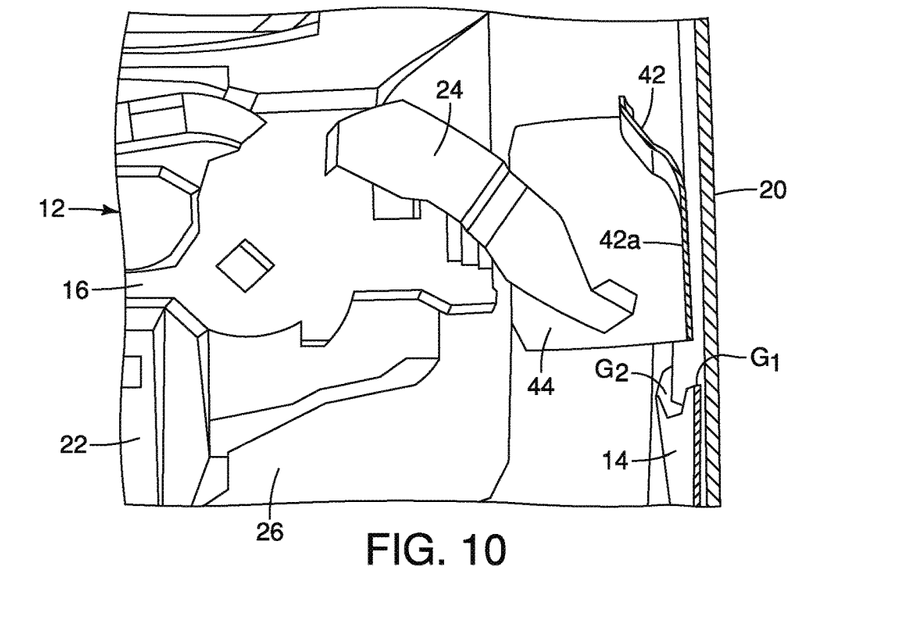
FIG. 10 is a front view (looking rearward) of a portion of the door cavity within the inner door panel showing the lever of the latch mechanism in the door closed orientation spaced apart from the lever capture portion of the reinforcing bracket in a non-impacted state in accordance with the exemplary embodiment.
Figure 11:
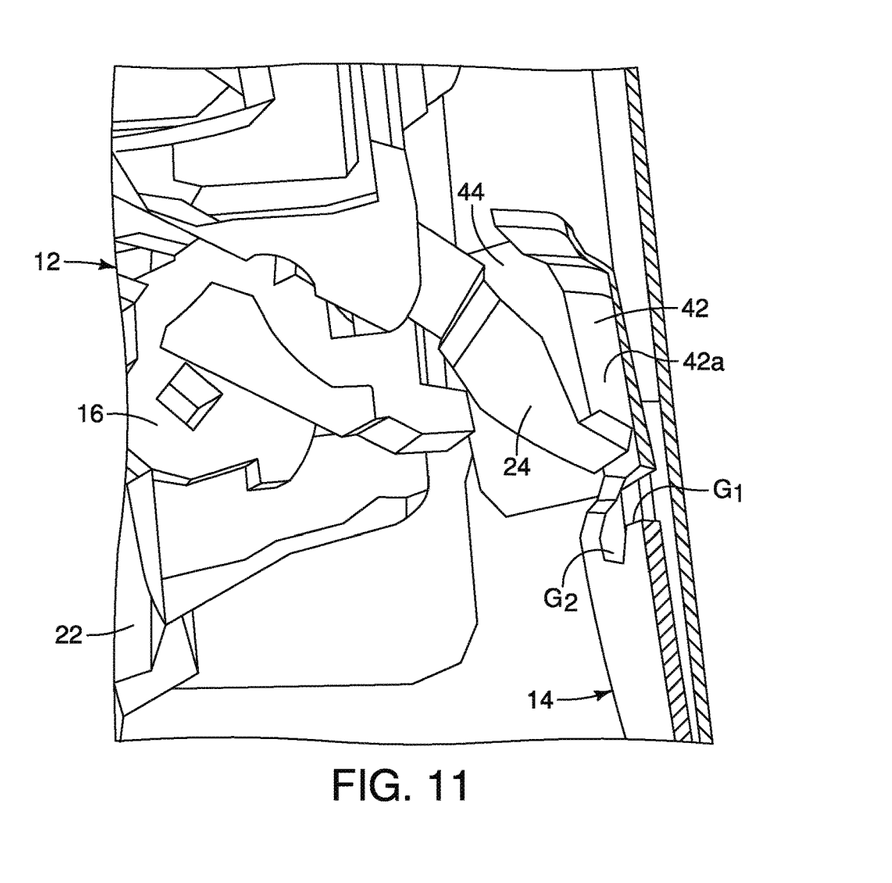
FIG. 11 is another front view (looking rearward) of the portion of the door cavity within the inner door panel depicted in FIG. 10 showing the lever capture portion of the reinforcing bracket in an impacted state during an impact event with the lever capture portion moved into contact with the lever of the latch mechanism preventing the lever from moving to a door opening orientation in response to a first impact force level in accordance with the exemplary embodiment.

As shown in FIGS. 6-8 and 10-12, the lever capture portion 42 is a cup shaped portion of the second end 34 of the reinforcing bracket 14. As shown in FIGS. 4 and 10-12, the lever capture portion 42 is located directly outboard from the latch lever 24 of the latch mechanism 16. More specifically, the lever capture portion 42 includes a concave surface 42a or area facing the latch lever 24 that defines the cup shape, as shown in FIG. 10. The lever capture portion 42 is dimensioned and shaped such that with the reinforcing bracket 14 in a non-deformed state (FIGS. 4 and 10) the latch lever 24 of the latch mechanism 16 can freely move toward the concave surface of the lever capture portion 42 in a non-contacting manner between the above described first and second positions (FIGS. 4 and 10). Further, in response to an impact event with a barrier B (FIG. 9) with a first level of impact force, the reinforcing bracket 14 is deformed such that the latch lever 24 contacts the concave surface of the lever capture portion 42 thereby restricting movement of the latch lever 24, as shown in FIG. 11. Consequently, during an impact event, the door latch mechanism 16 does not release the door assembly 12 because the lever 24 cannot move and the door assembly 12 remains in the closed orientation shown in FIGS. 1 and 9.

The lever capture portion 42 extends a second distance $D_2$ rearward from the main body 32 of the reinforcing bracket 14. The first distance $D_1$ is greater than the second distance $D_2$, as shown in FIGS. 6-8.

As shown in FIGS. 4, 6 and 7, the tab portion 44 is an elongated projection that is located adjacent to the lever capture portion 42 and extends in an inboard direction $D_I$, as shown in FIGS. 6 and 7. The tab portion 44 is located a third distance $D_3$ rearward from the main body 32 of the reinforcing bracket 14. The third distance $D_3$ is greater than the second distance $D_2$ and the first distance $D_1$ is greater than the third distance $D_3$, as shown in FIGS. 6-8.

A gap $G_1$ is defined between the tab portion 44, the attachment portion 40 of the second end 34 and the flat portion 46 of the reinforcing bracket 14, as shown in FIGS. 7 and 8. The gap $G_1$ has an enlarged section $G_2$ that is located below the lever capture portion 42 and above a central upper end of the flat portion 46.

As shown in FIGS. 3 and 5-8, the flat portion 46 of the second end 34 is defined between the rearward end of the main body 32 and the attachment portion 50 of the reinforcing bracket 14. The flat portion 46 is connected and formed unitarily with the main body 32, the lever capture portion 42 and the attachment portion 40. Since the flat portion 46 has no ribs or strengthening undulations formed there in, The flat portion 46 can undergo some deformation in response to an impact event.

Accordingly, as shown in FIGS. 6-8 and 12, the flat portion 46 can define two upwardly extending axes, first axis $A_1$ and a second axis $A_2$ about which deformation can occur during an impact event. Specifically, during an impact event, the flat portion 46 is dimensioned and shaped to be deformable about the first axis $A_1$ and the second axis $A_2$, as shown schematically in FIG. 12 and described further below.

Figure 12:
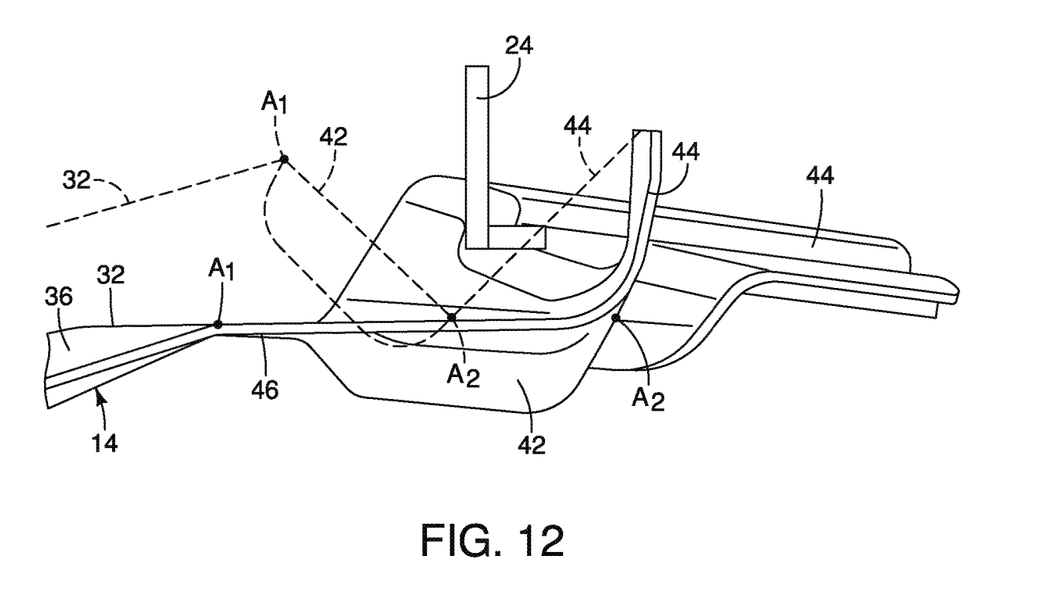
FIG. 12 is a top view of the portion of the rearward end of the reinforcing bracket showing the lever capture portion and the tab portion of the reinforcing bracket in another impacted state during another impact event with the lever capture portion rotated about a first axis and moved in a forward direction away from the lever of the latch mechanism and with the tab portion moved toward the lever such that the lever is prevented by the tab portion moving to a door opening orientation in response to a second impact force level greater than the first impact force in accordance with the exemplary embodiment.

The first axis $A_1$ and the second axis $A_2$ extend in upright directions but are not necessarily parallel. Specifically, the first axis $A_1$ and the second axis $A_2$ can define an acute angle therebetween. The acute angle can be any value between 1 and 20 degrees. In the depicted embodiment, the acute angle is between 9 and 10 degrees. The first axis $A_1$ extends upwardly forward of the lever capture portion and the gap $G_2$. The second axis $A_2$ extends upwardly rearward of the lever capture portion.

As shown in FIG. 9, the vehicle 10 can experience an impact event with the barrier B, as shown in FIG. 9. With the impact event being at a first level of impact force, the reinforcing bracket 14 is deformed such that the latch lever 24 contacts the concave surface of the lever capture portion 42 thereby restricting movement of the latch lever 24, as shown in FIG. 11. In this case, the deformation of the reinforcing bracket 14 is such that the lever capture portion 42 only is moved into the movement path of the latch lever 24. However, the second end 34 of the reinforcing bracket 14 is dimensioned and shaped (configured) such that in response to an impact event having a second level of impact force greater than the first level of impact force, the lever capture portion 42 and the tab portion 44 can undergo further deformation and displacement. In this case, the lever capture portion 42 and the tab portion 44 can undergo angular displacement about one or both of the axes $A_1$ and/or $A_2$ relative to the latch lever 26 and the attachment portion 40 of the reinforcing bracket 14 due to the presence of the gaps $G_1$ and $G_2$, as shown schematically in FIG. 12. Consequently, the tab portion 44 is moved into the movement path defined by the latch lever 24 thereby interfering with movement of the latch lever 24.

The vehicle 10 includes various body structures and vehicle devices that are conventional components that are well known in the art. Since these body structures and vehicle devices are well known in the art, these structures will not be discussed or illustrated in detail herein. Rather, it will be apparent to those skilled in the art from this disclosure that the components can be any type of structure that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part." "section." "portion," "member" or "element" when used in the singular can have the dual meaning of a single part or a plurality of parts. Also as used herein to describe the above embodiment, the following directional terms "forward", "rearward", "above". "downward". "vertical". "horizontal". "below" and "transverse" as well as any other similar directional terms refer to those directions of a vehicle equipped with the vehicle door assembly. Accordingly, these terms, as utilized to describe the present invention should be interpreted relative to a vehicle equipped with the vehicle door assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle door assembly, comprising:
    an inner door panel that at least partially defines a door cavity;
    a latch mechanism having a latch lever, the latch mechanism being configured to retain the vehicle door assembly in a closed orientation and is operable to release the vehicle door from the closed orientation; and
    a reinforcing bracket having a first end, a main body and a second end, the first end being attached to a forward area of the inner door panel, the main body extending from the first end to the second end and the second end having an attachment portion, a lever capture portion and a tab portion, the attachment portion being attached to a rearward area of the inner door panel adjacent to the latch lever of the latch mechanism, the lever capture portion being directly outboard from the latch lever and the tab portion being adjacent to the lever capture portion extending in an inboard direction, a gap being defined between the tab portion and the attachment portion of the second end of the reinforcing bracket, and in response to an impact event having a first level of impact force on the vehicle door assembly, the reinforcing bracket is shaped and dimensioned to deform moving the lever capture portion inboard toward the latch lever thereby interfering with movement of the latch lever.

2. The vehicle door assembly according to claim 1, further comprising
    an outer door panel having an outer peripheral edge portion that is fixedly attached to corresponding portions of an outer peripheral edge portion of the inner door panel defining the door cavity therebetween.

3. The vehicle door assembly according to claim 1, wherein
    the attachment portion extends a first distance rearward from the main body of the reinforcing bracket and the capture portion extends a second distance rearward from the main body of the reinforcing bracket, the first distance being greater than the second distance.

4. A vehicle door assembly, comprising:
an inner door panel at least partially defining a door cavity;
a latch mechanism having a latch lever, the latch mechanism being configured to retain the vehicle door assembly in a closed orientation and is operable to release the vehicle door from the closed orientation; and
a reinforcing bracket having a first end, a main body and a second end, the first end being attached to a forward area of the inner door panel, the main body extending from the first end to the second end and the second end having an attachment portion, a lever capture portion and a tab portion, the attachment portion being attached to a rearward area of the inner door panel adjacent to the latch lever of the latch mechanism, the lever capture portion being directly outboard from the latch lever and the tab portion being adjacent to the lever capture portion extending in an inboard direction, the attachment portion extending a first distance rearward from the main body of the reinforcing bracket and the capture portion extending a second distance rearward from the main body of the reinforcing bracket, the first distance being greater than the second distance, the tab portion being adjacent to the capture portion and is located a third distance rearward from the main body of the reinforcing bracket, the third distance being greater than the second distance with the first distance being greater than the third distance, and in response to an impact event having a first level of impact force on the vehicle door assembly, the reinforcing bracket is shaped and dimensioned to deform moving the lever capture portion inboard toward the latch lever thereby interfering with movement of the latch lever.

5. The vehicle door assembly according to claim 4, wherein
a gap is defined between the tab portion and the attachment portion of the second end of the reinforcing bracket.

6. The vehicle door assembly according to claim 5, wherein
the gap has an enlarged section that is located between a rearward end of the lever capture portion and the attachment portion.

7. The vehicle door assembly according to claim 1, wherein
the gap has an enlarged section that is located between a rearward end of the lever capture portion and attachment portion of the reinforcing bracket.

8. The vehicle door assembly according to claim 7, wherein
the main portion of the reinforcing bracket has a plurality of longitudinally extending strengthening ribs, and
the second end of the reinforcing bracket includes a flat portion connected and formed unitarily with the main portion, the flat portion being deformable about two upwardly extending axes during the impact event.

9. The vehicle door assembly according to claim 8, wherein
the two upwardly extending axes define an acute angle therebetween.

10. The vehicle door assembly according to claim 9, wherein
a first one of the two upwardly extending axes extends upwardly forward of the lever capture portion and the gap.

11. The vehicle door assembly according to claim 10, wherein
a second one of the two upwardly extending axes extends upwardly rearward of the lever capture portion.

12. The vehicle door assembly according to claim 9, wherein
the second end of the reinforcing bracket is configured such that in response to an impact event having a second level of impact force greater than the first level of impact force, the lever capture portion and the tab portion can undergo angular displacement about at least one of the two upwardly extending axes such that the tab portion is moved into a movement path defined by the latch lever thereby interfering with movement of the latch lever.

13. A vehicle door assembly, comprising:
an inner door panel at least partially defining a door cavity;
a latch mechanism having a latch lever, the latch mechanism being configured to retain the vehicle door assembly in a closed orientation and is operable to release the vehicle door from the closed orientation; and
a reinforcing bracket having a first end, a main body and a second end, the first end being attached to a forward area of the inner door panel, the main body extending from the first end to the second end and the second end having an attachment portion, a lever capture portion and a tab portion, the attachment portion being attached to a rearward area of the inner door panel adjacent to the latch lever of the latch mechanism, the lever capture portion being directly outboard from the latch lever and the tab portion being adjacent to the lever capture portion extending in an inboard direction, a gap being defined between the tab portion and the attachment portion of the second end of the reinforcing bracket, and in response to an impact event having a first level of impact force on the vehicle door assembly, the reinforcing bracket is shaped and dimensioned to deform moving the lever capture portion inboard toward the latch lever thereby interfering with movement of the latch lever, wherein
the lever capture portion includes a concave surface facing the latch lever that defines a cup shape dimensioned such that with the reinforcing bracket in a non-deformed state the latch lever of the latch mechanism can freely move toward the concave surface in a non-contacting manner and with the reinforcing bracket being deformed in response to the impact event having the first level of impact force, the latch lever contacts the concave surface thereby undergoing restricted movement.

14. The vehicle door assembly according to claim 13, wherein
the second end of the reinforcing bracket is configured such that in response to an impact event having a second level of impact force greater than the first level of impact force, the lever capture portion and the tab portion can undergo angular displacement such that the tab portion is moved into a movement path defined by the latch lever thereby interfering with movement of the latch lever.

15. The vehicle door assembly according to claim 1, wherein
the main portion of the reinforcing bracket has a plurality of longitudinally extending strengthening ribs, and
the second end of the reinforcing bracket includes a flat portion connected and formed unitarily with the main portion, the flat portion being deformable about two upwardly extending axes during the impact event.

16. The vehicle door assembly according to claim 15, wherein
the two upwardly extending axes define an acute angle therebetween.

17. The vehicle door assembly according to claim 16, wherein
a first one of the two upwardly extending axes extends upwardly forward of the lever capture portion and the gap.

18. The vehicle door assembly according to claim 17, wherein
a second one of the two upwardly extending axes extends upwardly rearward of the lever capture portion.

19. The vehicle door assembly, according to claim 3, wherein
the tab portion is adjacent to the capture portion and is located a third distance rearward from the main body of the reinforcing bracket, the third distance being greater than the second distance with the first distance being greater than the third distance.

* * * * *